United States Patent [19]

Beard

[11] 3,785,841

[45] Jan. 15, 1974

[54] WAX COMPOSITION
[76] Inventor: William A. Beard, 2301 Dodge Ave., Fort Wayne, Ind. 46805
[22] Filed: Feb. 10, 1969
[21] Appl. No.: 798,126

[52] U.S. Cl................. 106/186, 106/201, 106/271
[51] Int. Cl. ...................... C08h 17/44, C08b 27/52
[58] Field of Search..................... 106/186, 270, 271

[56] References Cited
UNITED STATES PATENTS
2,147,629  2/1939  Charch ................................ 260/22

FOREIGN PATENTS OR APPLICATIONS
722,227  11/1965  Canada
725,715  1/1966   Canada
727,687  2/1966   Canada
743,629  9/1966   Canada
770,202  10/1967  Canada
776,755  1/1908   Canada Primary Examiner—Theodore Morris
Attorney—Hood, Gust et al.

[57] ABSTRACT

A wax composition which can be used as a protective coating, a release agent, or the like, and applied to articles by spraying or brushing the composition onto the article or by dipping the article in the composition or the like. The wax composition comprises a homogeneous combination of a wax and a thermoplastic resin and/or a fatty amide in solution. The solution in a specific embodiment contains a wax, a thermoplastic resin, a fatty amide, an aromatic solvent, an aliphatic petroleum solvent, and a chlorinated solvent.

18 Claims, No Drawings

WAX COMPOSITION

BACKGROUND OF THE INVENTION

Field of the Invention

Wax compositions have long been used as protective coatings. It has long been desirable, however, to provide a wax coating which is reasonably resistant to abrasion, will repel moisture and has a relatively low degree of adhesion. Also, it has long been desirable to provide a wax composition which possesses good adherence to materials as different as glass, metal, plastics, rubber and the like. Further, it has long been desirable to provide a wax composition which can be applied as a coating to various articles by spraying or brushing the composition on said articles or by dipping the articles in said composition or the like, said coating having the afore-mentioned good adhesion, abrasion resistance, and moisture repellency and low adhesion. Still further it is desirable that the wax composition be relatively stable and have a long shelf life. In this regard, many prior art wax compositions do not remain homogeneous and the ingredients thereof may tend to separate or evaporate upon standing for relatively long lengths of time.

SUMMARY OF THE INVENTION

It is the primary object of this invention to provide an improved wax composition.

Another object of this invention is to provide an improved wax composition which can be applied as a coating by spraying or brushing the composition onto articles or by dipping articles in the composition.

Yet another object of this invention is to provide an improved wax composition which possesses improved adherence to materials as varied as glass, metals, rubber and the like.

Yet another object of this invention is to provide an improved coating which possesses improved abrasion resistance and moisture repellency and low adhesion.

A further object of this invention is to provide an improved wax composition which can be applied as a coating from solution and which dries to a relatively hard, abrasion resistant, moisture repellent, non-tacky wax coating having a relatively low degree of adhesion in a relatively short time.

In the broader aspects of the invention, there is provided a wax composition comprising a homogeneous combination of a wax and a thermoplastic resin.

The above-mentioned and other features and objects of this invention and the manner of attaining them will become more apparent and the invention itself will be best understood by reference to the following description of an embodiment of the invention.

DESCRIPTION OF THE PREFERRED EMBODIMENT

The composition of this invention generally comprises a homogeneous combination of a wax and a thermoplastic resin and/or a fatty amide in solution. The preferred embodiment of the wax composition comprises a wax, a thermoplastic resin, a fatty amide, an aromatic solvent, an aliphatic petroleum solvent, and a chlorinated solvent. Several different waxes, thermoplastic resins, fatty amides, and solvents can be used. The description of the preferred waxes, resins, amides, and solvents appear hereinbelow.

The wax, preferably is a microcrystalline wax. The petroleum industry refines three types of wax from crude oil: paraffin waxes, intermediate waxes, and microcrystalline waxes. Microcrystalline waxes in general have molecular weights averaging higher than that of paraffin waxes and intermediate waxes. Microcrystalline waxes are separated from high molecular weight residual petroleum stocks which have not been volatilized or distilled during processing. In contrast, paraffin and intermediate waxes are derived from wax and lube distillates, and thus, have been volatilized and distilled.

The microcrystalline waxes which are preferred in the composition of this invention are long-chain hydrocarbon compounds and complex mixtures of normal paraffinic, isoparaffinic and naphthenic solid hydrocarbons. These waxes generally have average molecular weights ranging from about 580 to about 700. These waxes also have melting points which are less than 170°F as determined by ASTM test method D-127 and needle penetrations greater than 25 at 77°F as determined by ASTM test method D-1321. These waxes also have no acid number and no saponification number. The waxes are also characterized by a flash point which is greater than 500°F. The oil content of such waxes is preferably below 5 percent weight of the wax. Such waxes may contain appreciable amounts of normal paraffins. The amount of normal paraffins may be indicated approximately by the amount of material reacting with urea. Preferably, from about 20 to about 50 percent weight of the wax will react with urea. The remainder of such waxes are naphthenic or isoparaffinic materials.

In a specific embodiment, the microcrystalline wax of the composition of this invention has a minimum melting point of about 165°F as determined by ASTM test method D-127, a maximum needle penetration of about 30 at 77°F, a flash point of about 550 to 580°F and a color maximum of about 1.5 as determined by ASTM test method D-1500. One such wax is the plastic wax sold under the mark "Victory" by Bareco Division of the Petrolite Corporation, Tulsa, Okla. Another wax that can be used is the wax sold under the mark "Ultraflex" by Bareco Division of the Petrolite Corporation, Tulsa, Okla.

The thermoplastic resin of the composition of this invention is preferably a thermoplastic cellulose ether. Such an ether results from the interaction of ethyl chloride and an alkali cellulose. Such a thermoplastic resin is known to dissolve readily in most solvents.

The maximum etherification possible for the ether resulting from the interaction of ethyl chloride and an alkali cellulose is the tri-ethyl derivative. However, the thermoplastic resins which are most useful in the composition of this invention contain less than the maximum ethoxyl content for such ethers. The ethoxyl content of the preferred thermoplastic resin is from about 48.0 to 49.5 percent weight of the ether. In a specific embodiment, such a resin in a solution containing 5 percent weight resin and 95 percent weight solvent, consisting of 80 percent weight toluene and 20 percent weight ethanol, has a viscosity of 100 centipoises ± 10 centipoises at room temperature (23°C ± 3°C) on a Brookfield viscometer. A specific ethyl cellulose resin of the type described above is sold under the trademark "Ethocel" by the Dow Chemical Company, Midland, Mich.

A thermoplastic cellulose ether resin having an ethoxyl content only from about 45.0 to about 46.5 percent weight of the ether can also be used. However, the solubility of this resin in the presence of the wax and solvent components of this invention was less than the afore-mentioned preferred resin. Similarly, another embodiment of the preferred resin having a viscosity of only 7 centipoises ± 1 centipoise at room temperature (23°C ± 3°C) in a solution containing 5 percent weight resin and 95 percent weight solvent, consisting of 80 percent weight toluene and 20 percent weight ethanol on a Brookfield viscometer, can also be used. This resin is soluble in the presence of the wax and solvent components of the invention; however, the resulting compositions did not have the resistance to abrasion, hardness or toughness that similar compositions containing the preferred resin possess.

The preferred amide of the composition of this invention is a high molecular weight aliphatic amide. This amide preferably has a wax-like texture, has a smooth texture when worked, is insoluble in water, and is soluble in the solvent components of the composition of this invention. In a specific embodiment, the amide of the composition of this invention is a fatty amide and can be an oleylamide. A specific oleylamide is that purified by the process disclosed and claimed in U.S. Pat. No. 3,373,174. Such an oleylamide has an approximate amide composition of 91 percent weight oleamide, 6 percent weight stearamide, and 3 percent weight linoleamide. One such amide is sold under the trademark "ARMID O" by Armour Industrial Chemical Company, Division of Armour & Company, Chicago, Ill.

The fatty amide is preferred over the corresponding acid as a component of the compositions of this invention. As indicated by Example XIV, the presence of acid effects the solubility of other components in the solvent components of the invention. No such problems are experienced when the fatty amide is used, even when the fatty amide is present in the composition in an amount several times greater than the amount of the acid causing such difficulties.

Referring to the solvents of the composition of this invention, it may be stated generally that many such solvents or combinations of solvents can be used successfully. Preferably, each solvent or combination of solvents should: 1. dissolve the wax, thermoplastic resin, and fatty amide of the composition and maintain the same in solution at room temperature, 2. allow the composition after it has been applied to the article to dry, harden or the like such that it can be polished, buffed or the like within 30 minutes after the composition is applied, 3. result in a completely homogeneous composition, and 4. be available in sufficient quantities to manufacture the composition of the invention and at prices which are reasonable and not exorbitant.

Generally, it is believed that an aromatic solvent is preferred to dissolve the wax of the composition and a chlorinated solvent is preferred to dissolve the thermoplastic resin of the composition to achieve the desired results above stated. The aliphatic petroleum solvent used in the wax composition of this invention primarily is used (it being relatively inexpensive) to decrease the total cost of the solvent ingredients of the composition. However, the choice of the various solvents used is also made in view of the volatility of the specific solvents. In a specific embodiment, the composition of this invention, after it has been applied as a coating to an article dries to a relatively hard, abrasion resistant, moisture repellent, non-tacky wax coating which can be buffed in less than 15 minutes. The choice of the various solvents is further made in view of the solubility of the wax, resin and amide components in the solvent components of the composition. In this regard, solvent components that are preferred have a combined specific gravity substantially equal to the combined specific gravity of the wax, resin and amide components of the invention.

With reference to the chlorinated solvent, the preferred chlorinated solvent is a solvent having a distillation range at 760 mm. of mercury of not less than about 35°C to not greater than about 122°C as determined by ASTM test method D-86. Specific chlorinated solvents which have been used with desirable results are perchlorethylene and a solvent having a major proportion of 1, 1, 1-trichloroethane and a minor proportion of 1, 1, 2, 2-tetrachloroethylene. A solvent of the latter description which has proven to be useful in the composition of this invention is that solvent sold under the trademark "Dowclene EC" by the Dow Chemical Company, Midland, Mich. Canadian Pat. No. 731,016 discloses and claims such a solvent. The major advantage of the latter solvent over the former is the lower toxicity that the latter solvent has when compared with perchloroethylene.

The preferred aromatic solvent is toluene. However, other aromatic solvents having a distillation range at 760 mm. of mercury of not less than about 77°C to not greater than about 120°C as determined by ASTM test method D-86 can be used.

References made to perchloroethylene and toluene above and any other solvent herein by generic name, of course, includes all solvent combinations having as a predominate part thereof the solvent named and other solvents which for the purposes of this invention are equivalents of the solvent named.

The preferred aliphatic petroleum solvent of the composition of this invention has a distillation range at 760 mm. of mercury of not less than about 40°C to not greater than about 170°C as determined by ASTM test method D-86. Two such solvents, which are readily available at reasonable prices, are sold under the names "special light naphtha" and "VM&P naphtha". Special light naphtha is preferred over VM&P naptha because of its lower volatility.

Other aliphatic petroleum solvents were used. The solvents which are satisfactory produced compositions in which the components were each in solution and the solution was stable; however, those solvents having lower flash points than the preferred solvent components are not preferred because of the increased fire hazard resulting from their use and those solvents having higher flash points than the preferred solvent components are not preferred because of their resulting in the composition drying subsequent to application too slowly to be preferred. Representative of the commercially available solvents which are satisfactory components of the compositions of this invention except for either the flash point of the solvent or the resulting drying rate of the composition are cyclohexane, mineral spirits, Stoddard solvent and kerosene.

In one specific preparation of the compositions of this invention, isopropyl alcohol was used in place of both the aromatic and aliphatic petroleum solvents of the composition. Substantially more isopropyl alcohol than, for example, toluene and VM&P naptha was required to keep the wax, resin and amide in solution. The use of isopropyl alcohol was not preferred both because of the amount of solvent required and the low flash point of the solvent.

The following Examples will serve to further disclose the composition of this invention. Except for Example IX and XIV each of the Examples discloses a composition which is satisfactory. Examples XXV through XXXIII relate to the use of said compositions.

EXAMPLE I 150 grains "VICTORY" wax
15 grains "ARMID O" amide
20 grains "ETHOCEL (STANDARD) 100 cps" resin 8 fluid drams toluene
4 fluid drams special light naphtha
4 fluid drams "DOWCLENE EC" solvent The amide and the resin were dissolved in the "DOWCLENE EC" solvent by heating the same to a temperature in excess of about 200°F. The resultant solution was held at this temperature for about ten minutes after the amide and resin had gone into solution. The resultant solution was cooled to a temperature sufficiently below the boiling point of the "DOWCLENE EC" solvent, for example, 100°F, to prevent the same from evaporating. The wax, toluene and the naptha were added to the solution. All of the ingredients were then heated to a temperature in excess of about 200°F and held at that temperature for about 10 minutes after all of the ingredients appeared to be in solution. The resultant solution was cooled to room temperature.

Upon standing at room temperature for about 24 hours, no separation of the wax, amide or resin was noted and the resultant composition appeared homogeneous throughout and was somewhat thixotropic.

The wax composition was applied to a glass panel by brushing the composition onto the panel. The resultant wax coating dried sufficient to touch in 2 hours 16 minutes and sufficient to buff in 2 hours 36 minutes. The room temperature was approximately 67°F and the relative humidity in the room was approximately 56 percent at the time of and subsequent to application. This composition is satisfactory but not preferred because of the time required for the composition to dry.

EXAMPLE II 150 grains "VICTORY" wax
3 grains "ARMID O" amide
4 grains "ETHOCEL (STANDARD) 100 cps" resin 8 fluid drams toluene
4 fluid drams special light naphtha
4 fluid drams "DOWCLENE EC" solvent The amide and the resin were dissolved in the "DOWCLENE EC" solvent by heating the same to a temperature in excess of about 200°F. The resultant solution was held at this temperature for about 10 minutes after the amide and resin had gone into solution. The resultant solution was cooled to a temperature sufficiently below the boiling point of the "DOWCLENE EC" solvent, for example 100°F, to prevent the same from evaporating. The wax, toluene and the naphtha were added to the solution. All of the ingredients were then heated to a temperature in excess of about 200°F and held at that temperature for about 10 minutes after all of the ingredients appeared to be in solution. The solution was cooled to room temperature. The resultant composition was somewhat thixotropic.

The wax composition was applied to a glass panel by brushing the composition onto the panel. The resultant wax coating dried sufficient to touch on the average in 9 minutes and sufficient to buff on the average in 13 minutes. The room temperature was approximately 67°F and the relative humidity in the room was approximately 45 percent at the time of and subsequent to application. This composition is the preferred composition of the invention.

EXAMPLE III 150 grains "ULTRAFLEX" wax
3 grains "ARMID O" amide
4 grains "ETHOCEL (STANDARD) 100 cps" resin 8 fluid drams toluene
4 fluid drams special light naphtha
4 fluid drams "DOWCLENE EC" solvent The amide and the resin were dissolved in the "DOWCLENE EC" solvent by heating the same to a temperature in excess of about 200°F. The resultant solution was held at this temperature for about 10 minutes after the amide and resin had gone into solution. The resultant solution was cooled to a temperature sufficiently below the boiling point of the "DOWCLENE EC" solvent, for example 100°F, to prevent the same from evaporating. The wax, toluene and the naphtha were added to the solution. All of the ingredients were then heated to a temperature in excess of about 200°F and held at that temperature for about 10 minutes after all of the ingredients appeared to be in solution. The solution was cooled to room temperature. The resultant composition was somewhat thixotropic.

The wax composition was applied to a glass panel by brushing the composition onto the panel. The resultant wax coating dried sufficient to touch on the average in 10 minutes and sufficient to buff on the average in 11 minutes. The room temperature was approximately 67°F and the relative humidity in the room was approximately 45 percent at the time of and subsequent to application. This composition is also the preferred composition of the invention.

EXAMPLE IV 150 grains "ULTRAFLEX" wax
1-½ grains "ARMID O" amide
4 grains "ETHOCEL (STANDARD) 100 cps" resin 8 fluid drams toluene
4 fluid drams special light naphtha
4 fluid drams "DOWCLENE EC" solvent The amide and the resin were dissolved in the "DOWCLENE EC" solvent by heating the same to a temperature in excess of about 200°F. The resultant solution was held at this temperature for about 10 minutes after the amide and resin had gone into solution. The resultant solution was cooled to a temperature sufficiently below the boiling point of the "DOWCLENE EC" solvent, for example 100°F, to prevent the same from evaporating. The wax, toluene and the naphtha were added to the solution. All of the ingredients were then heated to a temperature in excess of about 200°F and held at that temperature for about 10 minutes after all of the ingredients appeared to be in solution. The solution was cooled to room temperature. The resultant composition was somewhat thixotropic.

The wax composition was applied to a glass panel by brushing the composition onto the panel. The resultant wax coating dried sufficient to touch in 9 minutes and sufficient to buff in 14 minutes. The room temperature was approximately 74°F and the relative humidity in the room was approximately 45 percent at the time of and subsequent to application.

Comparison between the wax compositions as applied to glass panels of this example and Examples II and III resulted in the conclusion that the wax compositions of Examples II and III seemed to exhibit the best adhesion to glass, and the resultant coatings seemed to exhibit the best repellency to moisture and the lowest adhesion. It is believed that the greater moisture repellency and lower adhesion of the compositions of Examples II and III are results of the greater amount of the amide in Examples II and III.

EXAMPLE V 25 grains "VICTORY" wax
3 grains "ARMID O" amide
4 grains "ETHOCEL (STANDARD) 100 cps" resin 4 fluid drams toluene
2 fluid drams special light naphtha
4 fluid drams "DOWCLENE EC" solvent The amide and the resin were dissolved in the "DOWCLENE EC" solvent by heating the same to a temperature in excess of about 200°F. The resultant solution was held at this temperature for about 10 minutes after the amide and resin had gone into solution. The resultant solution was cooled to a temperature sufficiently below the boiling point of the "DOWCLENE EC" solvent, for example 100°F, to prevent the same from evaporating. The wax, toluene and the naphtha were added to the solution. All of the ingredients were then heated to a temperature in excess of about 200°F and held at that temperature for about 10 minutes after all of the ingredients appeared to be in solution. The solution was cooled to 77°F. The resultant composition was somewhat thixotropic.

The wax composition was applied to a glass panel by brushing the composition onto the panel. The resultant wax coating did not dry sufficient to touch in 50 minutes. The room temperature was approximately 65°F and the relative humidity in the room was approximately 57 percent at the time of and subsequent to application. The resultant wax coating was greasy and exhibited poor adhesion to the panel.

EXAMPLE VI 75 grains "VICTORY" wax
3 grains "ARMID O" amide
4 grains "ETHOCEL (STANDARD) 100 cps" resin 8 drams toluene
4 fluid drams special light naphtha
4 fluid drams "DOWCLENE EC" solvent The amide and resin were dissolved in the "DOWCLENE EC" solvent by heating the same to a temperature in excess of about 200°F. The resultant solution was held at this temperature for about 10 minutes after the amide and resin had gone into solution. The resultant solution was cooled to a temperature sufficiently below the boiling point of the "DOWCLENE EC" solvent, for example 100°F, to prevent the same from evaporating. The wax, toluene and the naphtha were added to the solution. All of the ingredients were then heated to a temperature in excess of about 200°F and held at that temperature for about 10 minutes after all of the ingredients appeared to be in solution. The resultant solution was then cooled to room temperature. The resultant composition was somewhat thixotropic.

The wax composition was applied to a glass panel by brushing the composition onto the panel. The resultant wax coating dried sufficient to touch in 29 minutes and sufficient to buff in 31 minutes. The room temperature was approximately 67°F and the relative humidity in the room was approximately 56 percent at the time of and subsequent to application.

Upon standing at room temperature, slight separation of the ingredients was noted. The wax composition of this Example is, however, usable provided the composition is shaken to render the composition substantially homogeneous throughout before application. The composition, however, is not preferred when compared with the compositions of Examples II and III because of the relatively long time required for the composition to dry. The composition also exhibits less adhesion to glass panels than the compositions of Examples II and III.

EXAMPLE VII 150 grains "VICTORY" wax
10 grains "ARMID O" amide
4 grains "ETHOCEL (STANDARD) 100 cps" resin 8 fluid drams toluene
4 fluid drams special light naphtha
4 fluid drams "DOWCLENE EC" solvent The amide and resin were dissolved in the "DOWCLENE EC" solvent by heating the same to a temperature in excess of about 200°F. The resultant solution was held at this temperature for about 10 minutes after the amide and resin had gone into solution. The resultant solution was cooled to a temperature sufficiently below the boiling point of the "DOWCLENE EC" solvent, for example 100°F, to prevent the same from evaporating. The wax, toluene and the naphtha were added to the solution. All of the ingredients were then heated to a temperature in excess of about 200°F and held at that temperature for about 10 minutes after all of the ingredients appeared to be in solution. The resultant composition was somewhat thixotropic. Upon standing at room temperature, no separation of the wax, amide or resin was noted and the resultant composition was homogeneous throughout.

The wax composition was applied to a glass panel by brushing the composition onto the panel. The resultant wax coating dried sufficient to touch in 32 minutes and sufficient to buff in 39 minutes. The room temperature was approximately 67°F and the relative humidity in the room was approximately 56 percent at the time of and subsequent to application. The resultant wax coating was more greasy and exhibited less adhesion to glass than coatings of the composition of Examples II and III.

EXAMPLE VIII 150 grains "VICTORY" wax
3 grains "ARMID O" amide
15 grains "ETHOCEL (STANDARD) 100 cps" resin 8 fluid drams toluene
4 fluid drams special light naphtha
4 fluid drams "DOWCLENE EC" solvent The amide and resin were dissolved in the "DOWCLENE EC" solvent by heating the same to a temperature in excess of about 200°F. The resultant solution was held at this temperature for about 10 minutes after the amide and resin had gone into solution. The resultant solution was cooled to a temperature sufficiently below the boiling point of the "DOWCLENE EC" solvent, for example 100°F, to prevent the same from evaporating. The wax, toluene and the naphtha were added to the solution. All of the ingredients were then heated to a temperature in excess of about 200°F and held at that temperature for about 10 minutes after all of the ingredients appeared to be in solution. The solution was then cooled to room temperature. Upon standing at room temperature, no separation of the wax, amide or resin was noted and the resultant composition was homogeneous throughout, and somewhat thixotropic.

The wax composition was applied to a glass panel by brushing the composition onto the panel. The resultant wax coating dried sufficient to touch in 16 minutes and sufficient to buff in 20 minutes. The room temperature was approximately 67°F and the relative humidity in the room was approximately 56 percent at the time of and subsequent to application.

The resultant wax coating was not greasy as compared with the composition of Example VII. The resultant wax coating was comparable to the wax coating resulting from the wax composition of Examples II and III except that a wax coating of the composition of this Example seemed to be appreciably harder than a wax coating of the composition of Examples II and III. This hardness of the wax coating of the composition of this Example may result in the wax coating cracking or chipping under certain conditions.

EXAMPLE IX 300 grains "VICTORY" wax
6 grains "ARMID O" amide
8 grains "ETHOCEL (STANDARD) 100 cps" resin 8 fluid drams toluene
4 fluid drams special light naphtha
4 fluid drams "DOWCLENE EC" solvent The amide and resin were dissolved in the "DOWCLENE EC" solvent by heating the same to a temperature in excess of about 200°F. The resultant solution was held at this temperature for about 10 minutes after the amide and resin had gone into solution. The resultant solution was cooled to a temperature sufficiently below the boiling point of the "DOWCLENE EC" solvent, for example 100°F, to prevent the same from evaporating. The wax, toluene and the naphtha were added to the solution. All of the ingredients were then heated to a temperature in excess of about 200°F and held at that temperature for about 10 minutes after all of the ingredients appeared to be in solution.

The resultant solution was cooled to room temperature. At approximately 150°F, the resin started to precipitate from the composition. What appeared to be complete separation occurred at 120°F. The wax and the amide may have also precipitated with the resin. This separation is believed to be caused by insufficient "DOWCLENE EC" solvent in the composition. When the composition reached 75°F, the composition was too viscous to flow.

The wax composition was applied to a glass panel by brushing the composition onto the panel. The resultant wax coating remained tacky and did not dry. This composition is not satisfactory.

EXAMPLE X 130 grains "VICTORY" wax
6 grains "ETHOCEL (STANDARD) 50 cps" resin
2 fluid ounces toluene The ingredients were mixed together and maintained at room temperature for 12 hours. The resultant solution was cloudy; most of the resin was in solution but only some of the wax was in solution. The ingredients were heated to a temperature in excess of 200°F and held until all of the wax and resin were in solution. The resultant solution was then cooled to room temperature.

The wax composition was applied to a glass panel by brushing the composition onto the panel. The resultant wax coating dried sufficient to touch in 3 minutes and sufficient to buff in 3-½ minutes. The room temperature was approximately 76°F and the relative humidity in the room was approximately 61 percent at the time of and subsequent to application. The resultant wax coating did not exhibit sufficient adhesion to glass or moisture repellency to be preferred.

Upon standing at approximately 77°F for approximately 2 hours, a portion of the toluene appeared to separate from the remainder of the solution.

EXAMPLE XI 130 grains "VICTORY" wax
12 grains "ETHOCEL (STANDARD) 100 cps" resin
2 fluid ounces toluene The wax and resin were dissolved in the toluene by heating the ingredients to a temperature in excess of about 200°F. The resin went into solution very slowly. The resultant solution was allowed to cool slowly to 80°F. Upon standing, no separation of the wax or resin was noted after 2 hours. Separation of the wax or resin did occur, however, after 4 hours of standing at room temperature. The resultant wax composition performed similar to the composition of Example X with the exception that a coating of the composition of this Example was harder and more brittle than a coating of the composition of Example X.

EXAMPLE XII 150 grains "VICTORY" wax
15 grains "ETHOCEL (STANDARD) 100 cps" resin 2 fluid ounces toluene The wax and the resin were added to the toluene and maintained at room temperature for 8 hours. It appeared that some of the wax and resin went into solution. The ingredients were then heated to a temperature in excess of 200°F and all of the wax and resin went into solution. The resultant solution was allowed to cool slowly. After standing, however, the resultant composition was solid and could not be applied, as desired. However, the composition could be applied by heating the composition.

EXAMPLE XIII
150 grains "VICTORY" wax  2 fluid ounces toluene

The wax was dissolved in the toluene by heating the same to a temperature in excess of about 190°F. The resultant solution was allowed to cool to room temperature. The resultant composition was much too heavy for good application.

The composition of this Example and the composition of Example XII were applied to a glass panel. The application was difficult and the adhesion of the composition of this Example to the glass panel was poorer than the adhesion of the composition of Example XII. The composition of Example XII dried to touch in 2 minutes 10 seconds and to buff in 2 minutes and 45 seconds. The room temperature was approximately 79°F and the relative humidity in the room was approximately 61 percent at the time of and subsequent to application. The composition of this Example dried to touch in 1-½ minutes and dried to buff in 4-½ minutes. The room temperature was approximately 78°F and the relative humidity in the room was approximately 61 percent at the time of and subsequent to application. The composition became too stiff for good application upon standing for about 8 months. While the composition of this Example could be applied more easily than the wax itself, the resultant coating of the composition of this Example did not exhibit any appreciable advantages over a coating of pure wax.

EXAMPLE XIV 150 grains "VICTORY" wax
15 grains "ETHOCEL (STANDARD) 100 cps" resin 10 minims Oleic acid
1 fluid ounce, 4 fluid drams special light naphtha
4 fluid drams perchlorethylene All of the ingredients were mixed together and heated to a temperature in excess of about 200°F. The ingredients were held at this temperature for about 30 minutes. The resin appeared not to go into solution.

EXAMPLE XV 150 grains "VICTORY" wax
10 grains "ETHOCEL (STANDARD) 100 cps" resin 4 fluid drams toluene
4 fluid drams perchlorethylene
1 fluid ounce special light naphtha The resin was dissolved in the toluene and perchlorethylene by heating these ingredients to a temperature in excess of about 200°F. The resultant solution was held at this temperature for about 10 minutes after the resin had gone into solution. The resultant solution was cooled to a temperature sufficiently below the boiling point of the solvent, for example 100°F, to prevent the same from evaporating. The wax and the naphtha were added to the solution. All of the ingredients were then heated to a temperature in excess of about 200°F and held at that temperature for about 10 minutes after all of the ingredients appeared to be in solution. The resultant solution was allowed to cool to room temperature. As the solution began to cool, the resin started to precipitate. Most of the resin precipitated upon standing at room temperature.

The wax composition was applied to a glass panel by brushing the composition onto the panel. The resultant wax coating dried sufficient to touch in 21 minutes and sufficient to buff in 27 minutes. The room temperature was approximately 74°F and the relative humidity in the room was approximately 49 percent at the time of and subsequent to application. The resultant wax coating did not exhibit as good adhesion to glass as a coating of the composition of Example XII. The coating was more like a coating of pure wax.

EXAMPLE XVI 150 grains "VICTORY" wax
5 grains "ETHOCEL (STANDARD) 100 cps" resin 4 fluid drams toluene
4 fluid drams perchlorethylene
1 fluid ounce special light naphtha The resin was dissolved in the toluene and perchlorethylene by heating the same to a temperature in excess of about 200°F. The resultant solution was held at this temperature for about 10 minutes after the resin had gone into solution. The resultant solution was cooled to a temperature sufficiently below the boiling point of the solvent, for example 100°F, to prevent the same from evaporating. The wax and the naphtha were added to the solution. All of the ingredients were then heated to a temperature in excess of about 200°F and held at that temperature for about 10 minutes after all of the ingredients appeared to be in solution. The resultant solution was then cooled. At about 150°F the resin began to precipitate. At room temperature, none of the resin appeared to have remained in solution.

The wax composition was applied to a glass panel by brushing the composition onto the panel. The resultant wax coating dried sufficient to touch in 11 minutes and sufficient to buff in 17-½ minutes. The room temperature was approximately 71°F and the relative humidity in the room was approxiamtely 46 percent at the time of and subsequent to application. The resultant wax coating of this Example was comparable with, no better than, and no worse than a wax coating of the composition of Example XV.

EXAMPLE XVII 150 grains "VICTORY" wax
5 grains "ETHOCEL (STANDARD) 100 cps" resin 8 fluid drams toluene
4 fluid drams perchlorethylene
4 fluid drams special light naphtha The resin was dissolved in the toluene and perchlorethylene by heating these ingredients to a temperature in excess of about 200°F. The resultant solution was held at this temperature for about 10 minutes after the resin had gone into solution. The resultant solution was cooled to a temperature sufficiently below the boiling point of the solvent, for example 100°F, to prevent the same from evaporating. The wax and the naphtha were added to the solution. All of the ingredients were then heated to a temperature in excess of about 200°F and held at that temperature for about 10 minutes after all of the ingredients appeared to be in solution. The resin remained in solution in this Example better than in Example XVI. The resultant composition was somewhat thixotropic.

The wax composition was applied to a glass panel by brushing the composition onto the panel. The resultant wax coating dried sufficient to touch in 12½ minutes and dried sufficient to buff in 15½ minutes. The room temperature was approximately 71°F and the relative humidity in the room was approximately 42 percent at the time of and subsequent to application. Small specks appeared in the resultant wax coating. These specks are believed to be resin which precipitated from solution.

EXAMPLE XVIII 150 grains "VICTORY" wax
5 grains "ETHOCEL (STANDARD) 100 cps" resin 8 fluid drams toluene
4 fluid drams "DOWCLENE EC" solvent
4 fluid drams special light naphtha The resin was added to the "DOWCLENE EC" solvent and the same was heated to a temperature in excess of about 200°F. Only a part of the resin dissolved in the "DOWCLENE EC" solvent. The resin and solution was held at this temperature for about 10 minutes and then, was cooled to a temperature sufficiently below the boiling point of the "DOWCLENE EC" solvent, for example 100°F, to prevent the same from evaporating. The wax, toluene and the naphtha were added to the solution. All of the ingredients were then heated to a temperature in excess of about 200°F and held at that temperature for about 10 minutes after all of the ingredients appeared to be in solution. All of the resin did not dissolve for at least 5 minutes after the addition of the tuluene. The resultant solution was allowed to cool to room temperature. The resin appeared to precipitate from the solution upon cooling.

The wax composition was applied to a glass panel by brushing the composition onto the panel. The resultant wax coating dried sufficient to touch in 9 minutes and sufficient to buff in 16 minutes. The room temperature was approximately 71°F and the relative humidity in the room was approximately 42 percent at the time of and subsequent to application. The resultant wax coating was smoother, harder and more resistant to abrasion than the wax coating of Example XVII; however, it is believed that more resin remained in solution than in Example XVII.

EXAMPLE XIX 150 grains "VICTORY" wax
6 fluid drams special light naphtha
2 fluid drams perchlorethylene All of the ingredients were mixed together and heated to a temperature in excess of about 200°F. This temperature was held for about 5 minutes, and then, the resultant solution was allowed to cool to room temperautre.

The wax composition was applied to a glass panel by brushing the composition onto the panel. The resultant wax coating dried sufficient to touch in 18 minutes and sufficient to buff in 25 minutes. The room temperature was approximately 72°F and the relative humidity in the room was approximately 40 percent at the time of and subsequent to application. The wax coating was better than average in all respects, but not as good as the coating of Example XXVIII. The wax coating of this Example is similar to a coating of the composition of Example XIII.

EXAMPLE XX 150 grains "VICTORY" wax
8 fluid drams toluene
4 fluid drams special light naphtha
4 fluid drams "DOWCLENE EC" solvent
1 grain "ETHOCEL (STANDARD) 100 cps" resin The resin was dissolved in the "DOWCLENE EC" solvent by heating the same to a temperature in excess of 200°F. The resultant solution was held at this temperature for about 10 minutes after the resin had gone into solution. The resultant solution was cooled to a temperature sufficiently below the boiling point of the "DOWCLENE EC" solvent, for example 100°F, to prevent the same from evaporating. The wax, toluene and the naphtha were added to the solution. All of the ingredients were then heated to a temperature in excess of about 200°F and held at that temperature for about 10 minutes after all of the ingredients appeared to be in solution. The solution was cooled to room temperature.

The wax composition was applied to a glass panel by brushing the composition onto the panel. The resultant wax coating dried sufficient to touch in 12½ minutes and sufficient to buff in 15½ minutes. The room temperature was approximately 69°F and the relative humidity in the room was approximately 40 percent at the time of and subsequent to application. The resultant wax coating did not exhibit sufficient hardness or resistance to abrasion or moisture repellency to be preferred. The composition become too stiff to apply after standing at room temperature for 6 months.

EXAMPLE XXI 150 grains "VICTORY" wax
8 fluid drams toluene
4 fluid drams special light naphtha
4 fluid drams "DOWCLENE EC" solvent
2 grains "ETHOCEL (STANDARD) 100 cps" resin The resin was dissolved in the "DOWCLENE EC" solvent by heating the same to a temperature in excess of 200°F. The resultant solution was held at this temperature for about 10 minutes after the resin had gone into solution. The resultant solution was cooled to a temperature sufficiently below the boiling point of the "DOWCLENE EC" solvent, for example 100°F, to prevent the same from evaporating. The wax, toluene and the naphtha were added to the solution. All of the ingredients were then heated to a temperature in excess of about 200°F and held at that temperature for about 10 minutes after all of the ingredients appeared to be in solution. After all of the ingredients were in solution, the solution was cooled slowly to room temperature.

The wax composition was applied to a glass panel by brushing the composition onto the panel. The resultant wax coating dried sufficient to buff in 10 minutes. The resultant wax coating was acceptable with regard to smoothness and abrasion resistance, however, the coating did not have sufficient moisture repellency to be preferred. The composition, however, became too stiff for application after standing at room temperature for 6 months.

EXAMPLE XXII 150 grains "VICTORY" wax
1½ grains "ARMID O" amide
8 fluid drams toluene
4 fluid drams special light naphtha
4 fluid drams "DOWCLENE EC" solvent
2 grains "ETHOCEL (STANDARD) 100 cps" resin The resin and the amide were dissolved in the "DOWCLENE EC" solvent by heating the same to a temperature in excess of about 200°F. The resultant solution was held at this temperature for about 10 minutes after the amide and resin had gone into solution. The resultant solution was cooled to a temperature sufficiently below the boiling point of the "DOWCLENE EC" solvent, for example 100°F, to prevent the same from evaporating. The wax, toluene and the naphtha were added to the solution. All of the ingredients were then heated to a temperature in excess of about 200°F and held at that temperature for about 10 minutes after all of the ingredients appeared to be in solution. The solution was cooled to room temperature. The resultant composition was somewhat thixotropic.

The wax composition was applied to a glass panel by brushing the composition onto the panel. The resultant wax coating dried sufficient to touch in 12 minutes and sufficient to buff in 40 minutes. The room temperature was approximately 72°F and the relative humidity in the room was approximately 25 percent at the time of and subsequent to application. The resultant wax coating adhered very well to the glass and was comparable to a coating of the composition of Example XXI in this respect. The resultant wax coating exhibited more moisture repellency than a coating of the composition of Example XXI but was not as resistant to wet buffing as desired.

EXAMPLE XXIII 150 grains "VICTORY" wax
1½ grains "ARMID O" amide
8 fluid drams toluene
4 fluid drams special light naphtha
4 fluid drams "DOWCLENE EC" solvent
4 grains "ETHOCEL (STANDARD) 100 cps" resin The resin and the amide were dissolved in the "DOWCLENE EC" solvent by heating the same to a temperature in excess of about 200°F. The resultant solution was held at this temperature for about 10 minutes after the amide and resin had gone into solution. The resultant solution was cooled to a temperature sufficiently below the boiling point of the "DOWCLENE EC" solvent, for example 100°F, to prevent the same from evaporating. The wax, toluene and the naphtha were added to the solution. All of the ingredients were then heated to a temperature in excess of about 200°F and held at that temperature for about 10 minutes after all of the ingredients appeared to be in solution. The resultant solution was cooled to about 80°F. The resultant composition was somewhat thixotropic.

The wax composition was applied to a glass panel by brushing the composition onto the panel. The resultant wax coating dried sufficient to touch in 11 minutes and sufficient to buff in 14 minutes. The resultant wax coating had good resistance to abrasion, greater resistance to buffing with water on the surface of the coating than a coating of the composition of Example XXII, but experienced a greater adhesion to materials such as relatively wet snow than a coating of the composition of Examples II and III, otherwise the resultant wax coating was satisfactory and comparable to a coating of the composition of Examples II and III.

EXAMPLE XXIV 150 grains "VICTORY" wax
1½ grains "ARMID O" amide
8 fluid drams toluene
4 fluid drams special light naphtha
4 fluid drams "DOWCLENE EC" solvent The wax and amide were added to the toluene and the ingredients were heated to a temperature in excess of about 200°F. The resultant solution was held at this temperature for about 10 minutes after the amide had gone into solution. The resultant solution was cooled to a temperature sufficiently below the boiling point of the "DOWCLENE EC" solvent, for example 100°F, to prevent the same from evaporating. The "DOWCLENE EC" and the naphtha were added to the solution. All of the ingredients were then heated to a temperature in excess of about 200°F and held at that temperature for about 10 minutes after all of the ingredients appeared to be in solution. The resultant solution was allowed to cool to room temperature which was about 80°F.

The wax composition was applied to a glass panel by brushing the composition onto the panel. The resultant wax coating dried sufficient to touch in 16 minutes and sufficient to buff in 22 minutes. The resultant wax coating was soft and "greasy." The resultant wax coating had poor resistance to abrasion and poor resistance to buffing with water on its surface, and thus, is not preferred.

EXAMPLES XXV through XXIX

Conventional metal snow shovels were respectively coated with the respective wax compositions of Examples II, XII, XIII, XXI and XXIII. The wax composition of each of the Examples was applied to the snow shovel by brushing the composition onto the shovel. The resultant wax coating was buffed when it became sufficiently dry. A snow shovel coated with the composition of Example II was preferred over all of the other shovels. A snow shovel coated with the composition of Example XXIII was next in preference. A snow shovel coated with the composition of Example XIII was next in preference. A snow shovel coated with the composition of Example XII was next in preference. A snow shovel coated with the composition of Example XXI was last in preference.

EXAMPLES XXX and XXXI

The wax compositions of Examples II and XIII were respectively applied to the propeller and the leading edges of the wings, ailerons and tail surfaces of an airplane. The airplanes were then flown in icing weather. While the pilot had constant trouble with carburetor icing and experienced icing on portions of the airplane not treated with the composition, no indication of icing on any of the propeller, wing, aileron or tail surfaces was noticed in either case.

EXAMPLES XXXII and XXXIII

The wax composition of Examples II and XIII was applied to a strip of black neoprene rubber approximately one-eighth inch in thickness. The resultant wax coating was allowed to dry for one hour. There was no indication that the wax composition affected in any way the neoprene rubber. Under a microscope, the surfaces appeared to be smooth and to be adhered to the rubber. The rubber was scraped with a dull needle to see if the wax compositions could be removed from the rubber and the rubber was stretched to see if the wax compositions would break loose from the rubber. The rubber was stretched approximately 100 percent of its original length. Microscopic examination of the rubber indicated that not all of the wax compositions were removed by the scraping action above-mentioned and the wax compositions did not break loose from the rubber. However, in all respects, the composition of Example II outperformed the composition of Example XIII.

From the Examples hereinabove, the method of this invention is clearly shown. In a specific embodiment, the method of this invention comprises the steps of adding the thermoplastic resin to the chlorinated or aromatic solvent and heating the same to a temperature of at least 200°F until the resin is completely in solution. If a fatty amide is used as an ingredient of the composition of this invention, the amide should also be added to the solvent with the thermoplastic resin. The chlorinated solvent in the compositions of this invention, when present, is present in an amount at least equal to 4 fluid drams for every 20 grains of resin, and in an amount greater than four fluid drams for each three hundred grains of wax. The amide can be present in an amount from about 0 to about 15 percent weight of the wax in the composition. The resin can be present in an amount from about 0.5 to 20 percent weight of the wax in the composition. Preferably the amide/resin ratio in the composition is about 0.75. The wax, aromatic solvent and aliphatic solvent are then added to this solution at a temperature in excess of about 200°F until all of the ingredients are dissolved. The total solvent component of the compositions of this invention comprises an amount which is greater than 12 fluid drams for every 300 grains of wax. More specifically, the aliphatic solvent is present in an amount less than about 4 fluid drams for each 55 grains of wax, and greater than about 1 fluid dram for each 160 grains of wax. The aromatic solvent is present in an amount less than about 4 fluid drams for each 25 grains of wax and greater than about 2 fluid drams for each 150 grains of wax.

While there have been described above the principles of this invention in connection with specific apparatus, it is to be clearly understood that this description is made only by way of example and not as a limitation to the scope of the invention.

What is claimed is:

1. A solution comprising a homogeneous combination of
    1. a major portion by weight of a microcrystalline wax
    2. a minor portion by weight of a fatty amide chosen from the group of octadecanamide, 9-octadecanamide, 9, 12-octadecadienamide, and combinations thereof, and
    3. a solvent of said wax and fatty amide, said combination being a liquid at room temperature.

2. The composition of matter of claim 1 wherein said wax has a melting point which is less than 170°F as determined by ASTM test method D-127 and a needle penetration greater than 25 at 77°F as determined by ASTM test method D-1321, said wax having no acid number and no saponification number, said wax having a flash point greater than 500°F.

3. The composition of matter of claim 2 wherein said wax also has a molecular weight from about 580 to about 700 and comprises paraffinic, naphthenic and isoparaffinic hydrocarbons.

4. The composition of matter of claim 1 further comprising a thermoplastic resin, said resin being a cellulose ether resulting from the interaction of ethyl chloride and an alkali cellulose, said solvent also being a solvent of said resin, said resin being present in an amount less than said wax.

5. The composition of matter of claim 4 wherein said resin has an ethoxyl content of from about 48.0 to about 49.5 percent weight, and wherein said resin in a 5 percent weight solution of resin in a solvent consisting of 80 percent weight toluene and 20 percent weight ethanol has a viscosity measured on a Brookfield viscometer at 23°C ± 3°C of 100 centipoises ± 10 centipoises.

6. The composition of matter of claim 1 wherein said fatty amide is essentially an amide of oleic acid.

7. The composition of matter of claim 1, wherein said solvent is at least 25 percent volume toluene.

8. The composition of matter of claim 4 wherein said solvent includes a chlorinated solvent.

9. The composition of matter of claim 1 wherein said solvent includes an aliphatic solvent in an amount less than about 4 fluid drams for each 55 grains of said wax.

10. The composition of matter of claim 8 wherein said chlorinated solvent has a distillation range at 760 millimeters of mercury of not less than about 35°C to not greater than about 122°C as determined by ASTM test method D-86.

11. The composition of matter of claim 1 wherein said solvent includes an aromatic solvent in an amount greater than about 2 fluid drams for each 155 grains of said wax.

12. The composition of matter of claim 11 wherein said aromatic solvent has a distillation range at 760 millimeters of mercury of not less than about 77°C to not greater than about 120°C as determined by ASTM test method D-86.

13. The composition of matter of claim 4 wherein said resin is present in amounts from about 0.5 to about 20 percent weight of said wax.

14. The composition of matter of claim 1 wherein said amide is present in an amount less than about 15 percent weight of said wax.

15. The composition of matter of claim 4 wherein said solvent comprises essentially about 50 percent volume toluene, 25 percent volume of a chlorinated solvent comprising from about 70 to about 90 percent weight, 1, 1, 1 trichlorethane and from about 10 to about 30 percent weight 1, 1, 2, 2 tetrachloroethylene.

16. The solution of claim 4 wherein said fatty amide is essentially an amide of oleic acid, and said solvent is greater than about 25 percent volume toluene.

17. The solution of claim 16 wherein from about 2 fluid drams to about 4 fluid drams of said toluene is present in said solution for every 25 grams of said wax.

18. A solution comprising a homogeneous combination of
1. a major portion by weight of a microcrystalline wax
2. a minor portion by weight of a fatty amide consisting of 6.0 percent by weight octadecanamide, 91.0 percent by weight 9-octadecanamide, and 3.0 percent by weight 9, 12-octadecadienamide, and
3. a solvent of said wax and fatty amide, said combination being a liquid at room temperature.

* * * * *